March 24, 1959  A. I. PETROVICH  2,879,376
METHOD OF WELDING CLAD METAL PLATES
Filed April 10, 1958

INVENTOR.
A.I. Petrovich.
BY
Attorney.

몰2,879,376
Patented Mar. 24, 1959

2,879,376

METHOD OF WELDING CLAD METAL PLATES

Anton I. Petrovich, Chester, Pa., assignor to Lukens Steel Company, Coatesville, Pa., a corporation of Pennsylvania Application April 10, 1958, Serial No. 727,661

4 Claims. (Cl. 219—137)

This invention relates to a novel method of welding clad metal plates, and more particularly to a method of welding clad metal plates with a low hydrogen electrode.

The principal object of the invention is to produce a weld between two clad metal plates which will not result in fissuring when subjected to bending or equivalent types of deformation providing tensile stressing conditions.

A further object of this invention is to form a crack and/or fissure resistant weld between two clad metal plates, the backing layer being carbon steel and the cladding layer being Hastelloy B.

Other objects will appear hereinafter throughout the specification.

Figure 1:
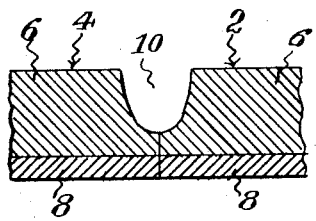
Figure 1 is a vertical section taken through meeting edge portions of two Hastelloy clad plates when in position to be welded.
Figure 2:
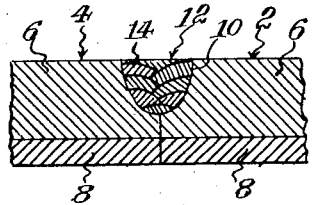
Figure 2 is a sectional view similar to Figure 1 but showing the weld which has been made in the backing layers of the clad plates.
Figure 3:
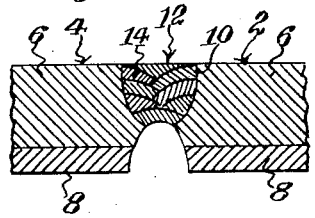
Figure 3 is a sectional view similar to Figure 2 but showing the welding groove formed to receive the weld on the clad side of the plates.
Figure 4:
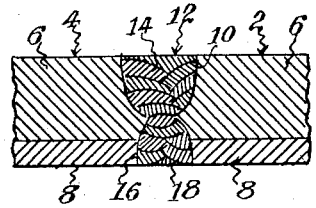
Figure 4 is a sectional view similar to Figures 1, 2 and 3 but showing the completed welds on both sides of the plates.
Figure 5:
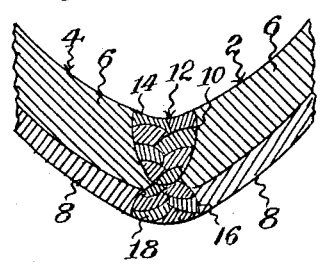
Figure 5 is a vertical sectional view through the welds and the adjacent portion of the plates showing how the welds resist cracking in a bend test.

Referring now to the figures of the drawing, the plates to be welded are shown as represented by the reference characters 2 and 4, and each plate is made up of a carbon steel backing layer 6 and a Hastelloy B layer 8 containing approximately 65% nickel, 28% molybdenum, and 6% iron. As clearly shown in Figure 1, the adjacent backing layers 6 are cut away to form more or less inclined portions which together form a welding groove 10 when the plates 2 and 4 are placed in edge to edge relation. It will be understood that all welding joint surfaces will be cleaned to present bright surfaces which should be thoroughly dried before the welding passes are started, as is well known in the art. After the walls of the welding groove 10 have been cleaned and dried, the weld 12 is formed by a low hydrogen welding electrode, as for example, one of those known in the trade as AWS–ASTM E616, E716, or E816. These electrodes consist of .06 to .12 percent carbon, .40 to .71 percent manganese, .35 to .66 percent silicon, .46 to .60 percent molybdenum, 1.00 to 3.30 percent nickel, 1.18 to 2.26 percent chromium, .035 maximum percent phosphorus, .035 maximum percent sulphur, and the balance essentially iron. The different welding beads formed by the several passes of the welding electrode are represented at 14 in Figures 2, 3, 4 and 5, as is conventional in the welding art. It is understood that the weld deposition pattern within such a joint is not limited to the sequence shown and described, and that it may be varied in such a manner as may be most advantageous, so long as the resulting deposit is essentially sound.

The welding groove 16 for the Hastelloy B layer 8 is formed by grinding by an abrasive wheel or by machining. If an abrasive wheel is used, care should be taken against prolonged grinding in any relatively short length of joint as it may raise the temperature in the welding zone to an undesirably high level. As clearly shown in Figures 4 and 5, the weld beads are indicated at 18. While these weld beads are for the most part formed by a Hastelloy B electrode, it has been found that stainless steel electrodes are most effective for use in forming the weld bead at the bottom of the groove and used as a barrier against undesirable pickup of iron from the backing layer. Depending on the size of the groove made by the grinding wheel or other groove-forming means, electrodes of a diameter of four or five thirty-seconds of an inch are preferable for the initial and subsequent passes. The size of the electrode should be such as to permit a smooth flow of weld metal with no slag entrapment during the welding process. The speed of travel of the electrode for the root bead on the Hastelloy B side should be approximately seven inches per minute.

It has been found that if electrodes of the type AWS–ASTM E610, E611, E612, E613, E620, and E630 are used in welding such clad plates as described herein, cracks will occur in bend tests when tested at a rate of less than 16 in. per minute ram speed, while if low hydrogen electrodes of the type AWS–ASTM E616, E716, and E816 are used, no cracking occurs in the weld at the same rate.

The root pass in the groove of the cladding layer may be AWS 310 or 25/20 stainless steel.

The above description and drawings disclose a single embodiment of the invention, and specific language has been employed in describing the figures. It will, nevertheless, be understood that no limitations of the scope of the invention are thereby comtemplated, and that various alterations and modifications may be made as would occur to one skilled in the art to which the invention relates.

I claim:

1. The method of welding together two clad metal plates, each of which has a backing layer of carbon steel and a cladding layer containing approximately 65% nickel, 28% molybdenum, and 6% iron, which comprises placing the plates in abutting edge to edge relation, the adjacent portions of said backing layers being inclined outwardly in opposite directions to form a weld groove in the abutting portions of the backing layers, forming a low hydrogen steel weld in said groove by a coated low hydrogen electrode containing .06 to .12% carbon, .40 to .71% manganese, .35 to .66% silicon, .46 to .60% molybdenum, 1.00 to 3.30% nickel, 1.18 to 2.26% chromium, .035% maximum phosphorus, .035% maximum sulphur, and the balance essentially iron, forming a weld groove in the cladding layer at the abutting edges of the plates, depositing a stainless steel bead in the bottom of said second groove, and using a plurality of covering beads to cover said stainless steel bead.

2. The method as defined in claim 1, wherein said covering beads are formed by a high alloy coated welding rod containing approximately 65% nickel, 28% molybdenum, and 6% iron.

3. The method of welding together two clad metal plates, each of which has a backing layer of carbon steel and a cladding layer containing approximately 65% nickel, 28% molybdenum, and 6% iron, which comprises placing the plates in abutting edge to edge relation, the adjacent portions of said backing layers being inclined outwardly in opposite directions to form a weld groove in the abutting portions of the backing layers, forming a low hydrogen steel weld in said groove by a coated low hydrogen electrode containing .07 to .10% carbon, .50 to .65% manganese, .45 to .55% silicon, .50 to .60% molybdenum, 1.50 to 3.00% nickel, 1.25 to 2.00% chromium, and the balance essentially iron, forming a weld groove in the cladding layer at the abutting edges of said plates, and forming a weld in said second groove.

4. The method of welding together two clad metal plates as defined in claim 3, wherein said last-mentioned weld comprises a stainless steel root bead and a plurality of covering beads formed by a high alloy coated welding electrode containing approximately 65% nickel, 28% molybdenum, and 6% iron.

References Cited in the file of this patent

UNITED STATES PATENTS

| | | |
|---|---|---|
| 1,812,123 | Stresau | June 30, 1931 |
| 2,416,379 | Cohn | Feb. 25, 1947 |